United States Patent [19]
Walter et al.

[11] Patent Number: 6,024,509
[45] Date of Patent: Feb. 15, 2000

[54] ARRANGEMENT FOR REMOTE-CONTROL FAST HOOKING BY MEANS OF FLEXIBLE SINGLE OR MULTIPLE CABLES

[75] Inventors: Barbieri Walter, S/Adda; Antonello Alicata, Dalmine; Crespi Giovanni, S/Adda, all of Italy

[73] Assignee: Cornelia Brambilla, Milan, Italy

[21] Appl. No.: 09/086,622

[22] Filed: May 29, 1998

[30] Foreign Application Priority Data

May 30, 1997 [IT] Italy ................... MI97A1274

[51] Int. Cl.[7] ........................................ F16B 9/00
[52] U.S. Cl. ................. 403/197; 403/194; 403/349; 74/501.5; 74/502; 74/500.5; 74/502.4
[58] Field of Search ................... 74/501.5, 502, 74/500.5, 502.4; 403/349, 187, 192, 193, 194, 195, 197

[56] References Cited

U.S. PATENT DOCUMENTS

| | | | |
|---|---|---|---|
| 1,671,390 | 5/1928 | Winning | 74/502 |
| 3,253,480 | 5/1966 | Fernberg | 74/502.4 X |
| 4,034,622 | 7/1977 | Deck | 74/502.4 X |
| 4,534,239 | 8/1985 | Heimann | 74/502.4 |
| 4,798,100 | 1/1989 | Baumgarten | 74/501.5 R |
| 4,887,481 | 12/1989 | Crack | 74/500.5 |
| 4,914,971 | 4/1990 | Hinkens et al. | 74/501.5 R X |
| 4,916,964 | 4/1990 | Crack | 74/501.5 R X |

FOREIGN PATENT DOCUMENTS

| | | |
|---|---|---|
| 2 450 373 | 9/1980 | France . |
| 29 36 186 | 3/1981 | Germany . |
| 41 09 446 | 9/1992 | Germany . |
| 246613 | 10/1987 | Japan ................... 74/501.5 R |

*Primary Examiner*—Lynne Reichard
*Assistant Examiner*—David E. Bochna
*Attorney, Agent, or Firm*—Oblon, Spivak, McClelland, Maier & Neustadt, P.C.

[57] ABSTRACT

An arrangement for remote-control fast hooking by use of flexible single or multiple cables, including a lever, capable of receiving the end portion of at least one cable and that can be swung with respect to a box element connectable to an external structure of an operating machine, the box element presenting at least one opening for the passage of a cable and the positioning of a reaction sheath housed into a containment bush, the bush having on its external surface bayonet elements for hooking which protrude and can be inserted, still being removable, inside the opening that presents engagement elements with/and holding elements of the elements for bayonet engagement. The elements for hooking include at least two teeth that protrude inside the bush and that are placed on opposite positions of a flange so that the positioning can be realized on both sides of the box, and appendices to limit the transverse movement of the cable.

13 Claims, 4 Drawing Sheets

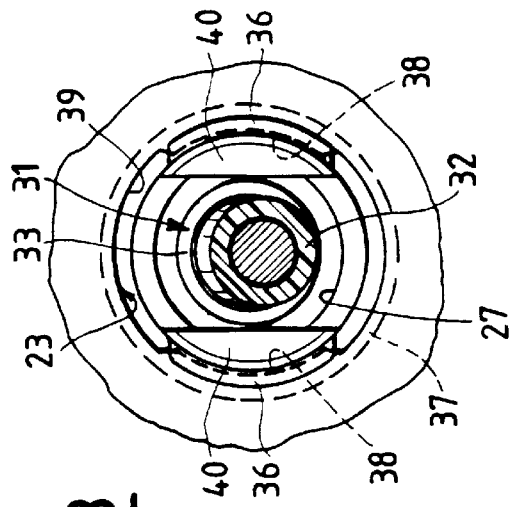
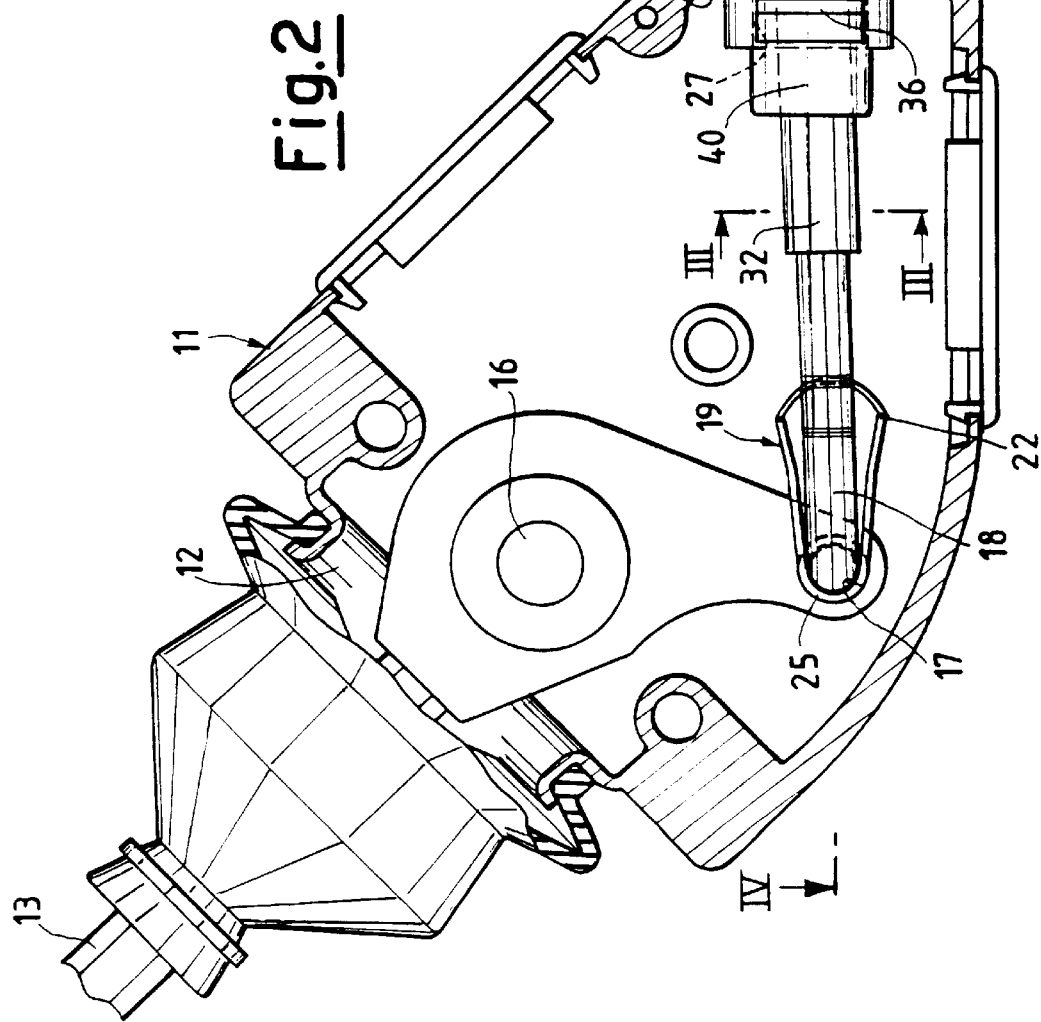

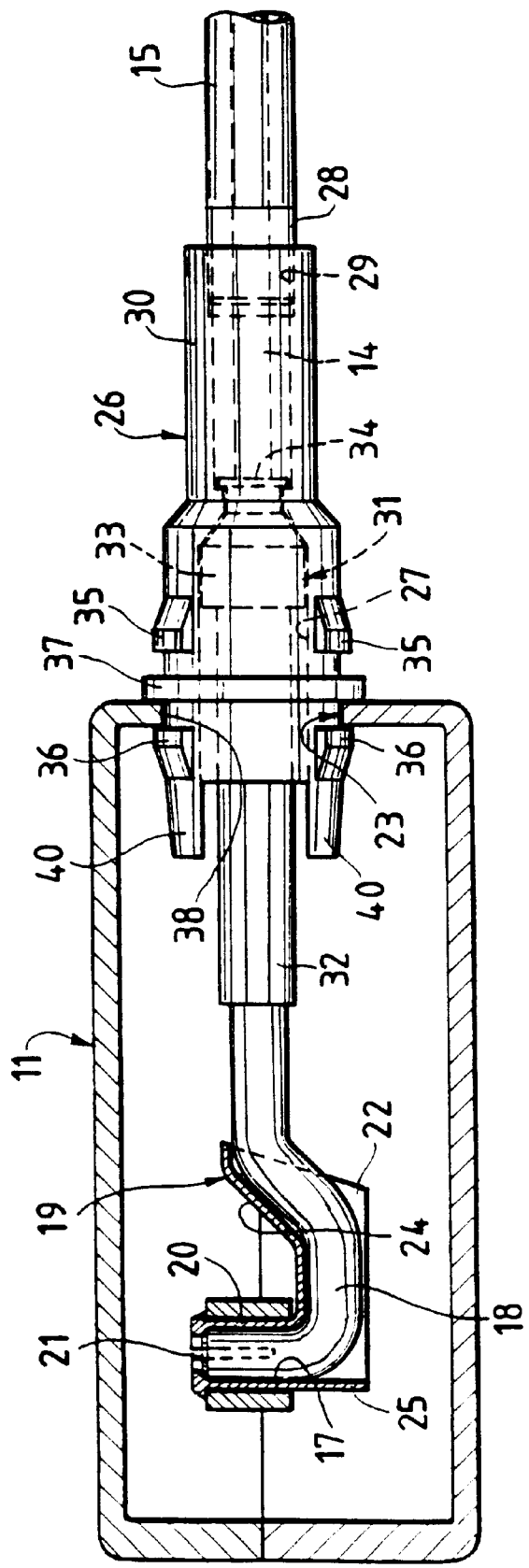

ARRANGEMENT FOR REMOTE-CONTROL FAST HOOKING BY MEANS OF FLEXIBLE SINGLE OR MULTIPLE CABLES

BACKGROUND OF THE INVENTION

1. Field of the Invention

The present invention refers to an arrangement for remote-control fast hooking by means of flexible single or multiple cables, especially one of the double-action type.

2. Discussion of the Background

In a device for remote-control by means of cables, be it a single or a multiple cable device, the assembly of the cable usually requires the use of tools that allow both assembly or disassembly of the box of the control lever. This is because it is necessary to allow the insertion of the cable in its reaction element, so that it is possible to achieve exactly the required working.

In a few cases, the positioning of the cable/s is achieved by removing a lid, said lid having two functions: the first one is being to open the lever box to cause the cable to be inserted; and the second one, when the lid is placed again in its seat, being to prevent the bush supporting the cable from becoming dislodged from its seat located between the box and the lid.

It is clear that this arrangement will take some time in order to have the bush, the lid and the element blocking the bush correctly placed. Besides, it is very important to be sure that all interactive parts are correctly placed and constrained.

SUMMARY OF THE INVENTION

Therefore it is an object of the present invention to solve the problem related to the correct positioning of the cable/s inside the box for the control lever for remote-control.

It is an additional object of the present invention to facilitate the insertion of the reaction bush of the cable inside the box, this being inserted from outside or from inside the box.

It is an additional object of the present invention to constrain the movement of the cable, as well as the resulting disengagement from its seat in the control lever, when the reaction bush of the cable is inserted into the box.

All the above mentioned objects of the present invention are achieved by provision of an arrangement as claimed in claim 1. The remaining claims define additional characteristics of the present invention.

BRIEF DESCRIPTION OF THE DRAWINGS

The characteristics and advantages of an arrangement for remote-control fast hooking by means of flexible single or multiple cables according to the present invention will appear clearer from the following description, provided as non-limiting examples and relating to the appended drawings, in which:

FIG. 2 is a view similar to that shown in FIG. 1 in which the bush carrying the control cable has been inserted, rotated and fixed into its position;

FIG. 3 is a sectional detail of FIG. 2 taken along line III—III;

FIG. 4 is an additional sectional detail taken along line IV—IV of FIG. 2 showing the engagement between the lever and the cable for remote-control transmission.

Figure 1:
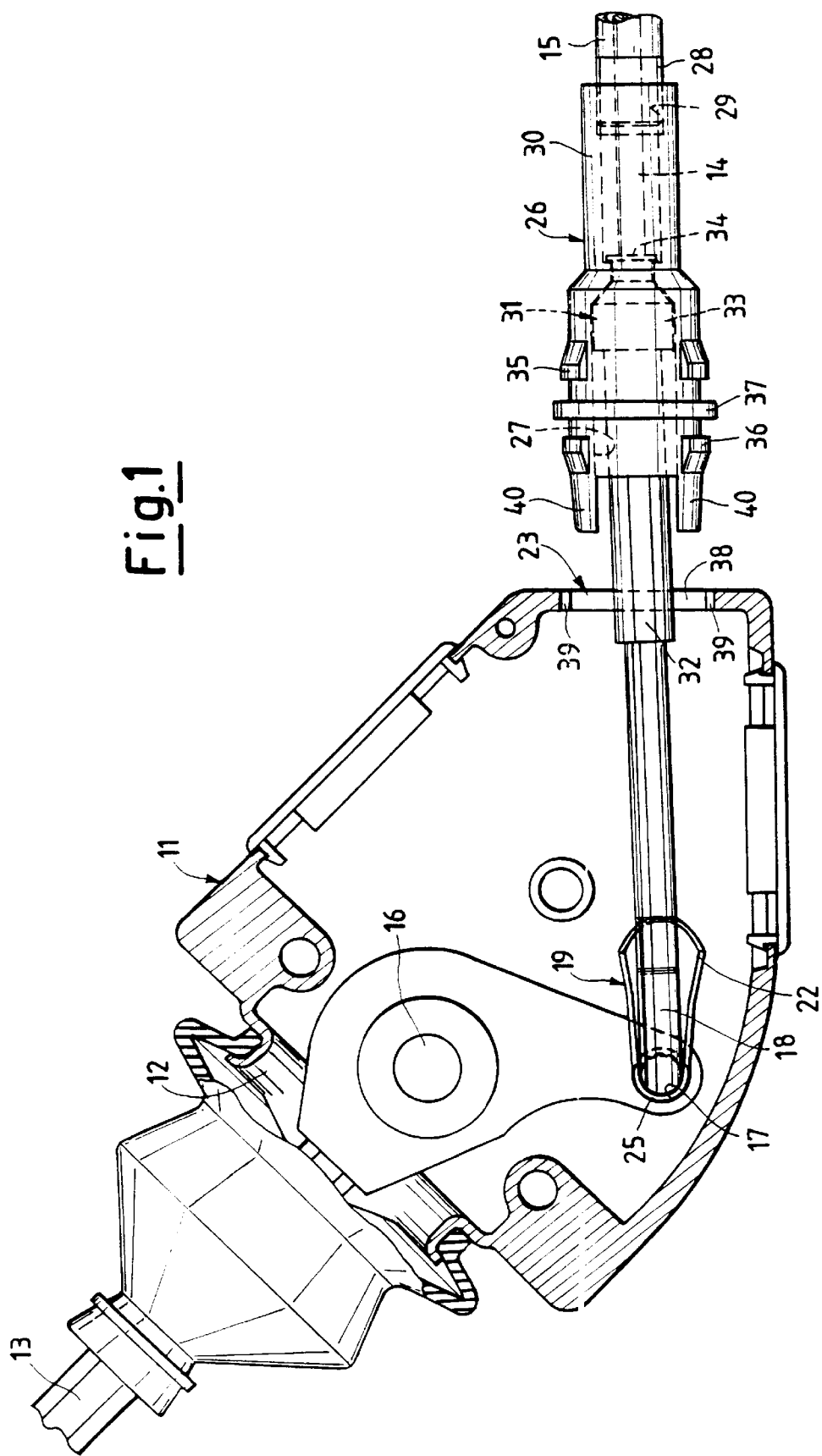
FIG. 1 is an elevation and exploded sectional view of an arrangement according to the present invention in a box of a remote control lever with the bush carrying the control cable.

With reference to the figures in general, it is shown an arrangement for fast-hooking of a remote control by means of flexible single or multiple cables, especially of the type of single or double action.

FIGS. from 1 to 4 show a box element or box 11, i.e. consisting of two coupled parts, connectable to an external structure of an operating machine. The box 11 is provided with one first opening 12 from which a control lever 13 for a core of a single cable 14 comes out, said cable being movable inside a reaction sheath 15.

The control lever 13 can oscillate around a pivot 16, which can be made integral with the box 11. At its internal end it is provided with a hole 17 capable of receiving the hook-shaped curved end portion 18 of the core of the cable 14. It must be noticed that, according to the present invention, a specially shaped driving element 19 is inserted into the hole 17 of the lever 13.

In particular, said specially shaped driving and support element 19 is made of a plastic material. Said driving and support element 19, which is specially shaped, is provided with a cylindrical part 20 that, by means of final notching 21, can be introduced, through elastic deformation, into the hole or seat 17 present on the lever 13. Said driving and support element 19 is then snapped inside said seat 17 of the lever 13.

A second part 22 of the driving and support element 19 is determined by a funnel-shaped configuration with a final V-shaped expansion. A first portion of the second part 22, directly connected to the first cylindrical part 20, is protected by two sides the height of which is sufficient to contain the movement of the final part of the cable 14. A second portion of the second part 22 facing an opening 23 on the box 11 where the cable 14 is introduced shows an inclined plane 24 on which the hook-shaped curved end 18 of the core of the cable 14 slides.

Before assemblying this driving and support element 19 and once the same has been positioned, the following assembly of the control device only requires that the final portion of the cable 14 and the hook-shaped curved end portion 18 are placed on the expansion 22 of the driving and support element 19 made of plastic material. The cable 14 is then slightly pushed so that said end proceeds on the inclined plane 24 until it abuts against one portion of the round wall 25 over the cylindrical part 20.

In this position, the end of the cable 14, that has been forced to deviate from its natural axis in order to advance upwards on the inclined plane 24, once deviated from the round wall 25, finds the first cylindrical part 20 of the driving and support element 19 in its seat 17 and snaps into the same seat, so that the cable and the control lever become engaged. In fact the hook-shaped curved end 18 has a shape which is complementary to that of almost the whole driving and support element 19 so that the two parts become firmly coupled in their operating position.

The entire process is performed without usage of assembly tools and in most of the cases there is no need to see the engagement point directly. This is the solution to the problem that arises when the side where the cable exits is the only accessible side in the control lever, while other sides cannot be seen directly or are not accessible because of the components of the machine on which the control device is installed.

To disassemble opposite operation order will be followed so that the cable can be replaced.

A further relevant and inventive characteristic of the present invention is a special bush 26 for the fast engagement and disengagement inside the opening 23 of the box 11.

The box area where such opening 23 is located is generally known as reaction area for remote transmission.

Such bush 26 for fast engagement and disengagement is provided with a central through cavity 27 which is so shaped as to allow the passage of the cable 14 made continuous by crimping of at least two pieces, not shown in the figures. A threaded end 28 of the sheath 15, in the outer part facing the box 11, is locked inside a complementary thread 29 made inside an extension 30 of the bush 26 intended to allow the reaction.

Inside such bush 26 there is, axially locked but oscillating, a joint element 31 which includes two elements 32 and 33 which are engaged to each other by means of a ball or cylindrical joint connection. The first joint element 32 serves as driving and protection sheath to the front part of the cable 14. Besides, the joint element 31 is inserted and locked inside the extension 30 of the internal cavity 27 of the support bush 26 by means of an end enlargement 34.

The bush 26, thus serving also as support element, can be inserted, still being removable, inside said opening 23 of the box 11.

In particular, such insertion is accomplished thanks to the presence of two pairs of teeth 35 and 36 radially protruding towards the external part of the body of the bush 26. Each of the teeth 35 and 36 takes up a circular part of the body (i.e. something less than one fourth of the circumference) and the teeth are placed on the opposite sides of a ring gear 37.

Such ring gear 37, also radially protruding towards the external part of the body of the bush 26, serves as a shoulder element against the body of the box 11 near the opening 23 and it is separated from the teeth 35 and 36 by a thickness which is at least equal to that of the wall of the base box element 11.

Besides, the opening 23 presents a round general part 38, the diameter of which is slightly higher than that of the bush 27 and two widened parts or expansion 39 of said opening 23, in which the pairs of teeth 35 and 36 can be inserted.

The thickness of the wall of the box with the opening 23 shall be such that said wall can be inserted while the bush is rotating between the teeth 35 or 36 and the ring gear 37 providing steady locking for the bush with a bayonet-like engagement (FIG. 2). In this manner, the external surface of the bush 26 is provided with bayonet engagement elements 35, 36, 37 which protrude and can be inserted, still being removable, into the opening 23 that also presents engagement elements with/and holding elements 38, 39 for the mentioned bayonet elements for hooking.

The opening 23 is shaped so that it shows a certain number of expansions 39 which protrude towards the centre of the hole. In the present embodiment, there are two expansions 39 located in diametrically opposite position, but such expansions could as well be one, three, four or more according to the dimensions of the bush 26, of the cable 14 and of the control box 11.

The different and contemporaneous positioning of the expansions protruding outside from both parts of the ring gear 37 determines the differences in the way the bush 26 is mounted on the box 11.

In the example shown in FIGS. 1–4, the assembly is realized by simply inserting the bush 26 so that its teeth 36 are inserted into the expansions 39 of the opening 23 of the box 11; after doing that, a 90° rotation, upwards or downwards according to the number of the expansions, will lock the bush into its seat.

A system of any type, i.e. a spring or a tight elastic engagement, to lock the rotation of the bush 26 in its operation position can be added.

The novelty is not to be find in the bayonet locking system itself but in its usage in a flexible cable remote control system and in particular in one of the push-pull type.

Figure 5:
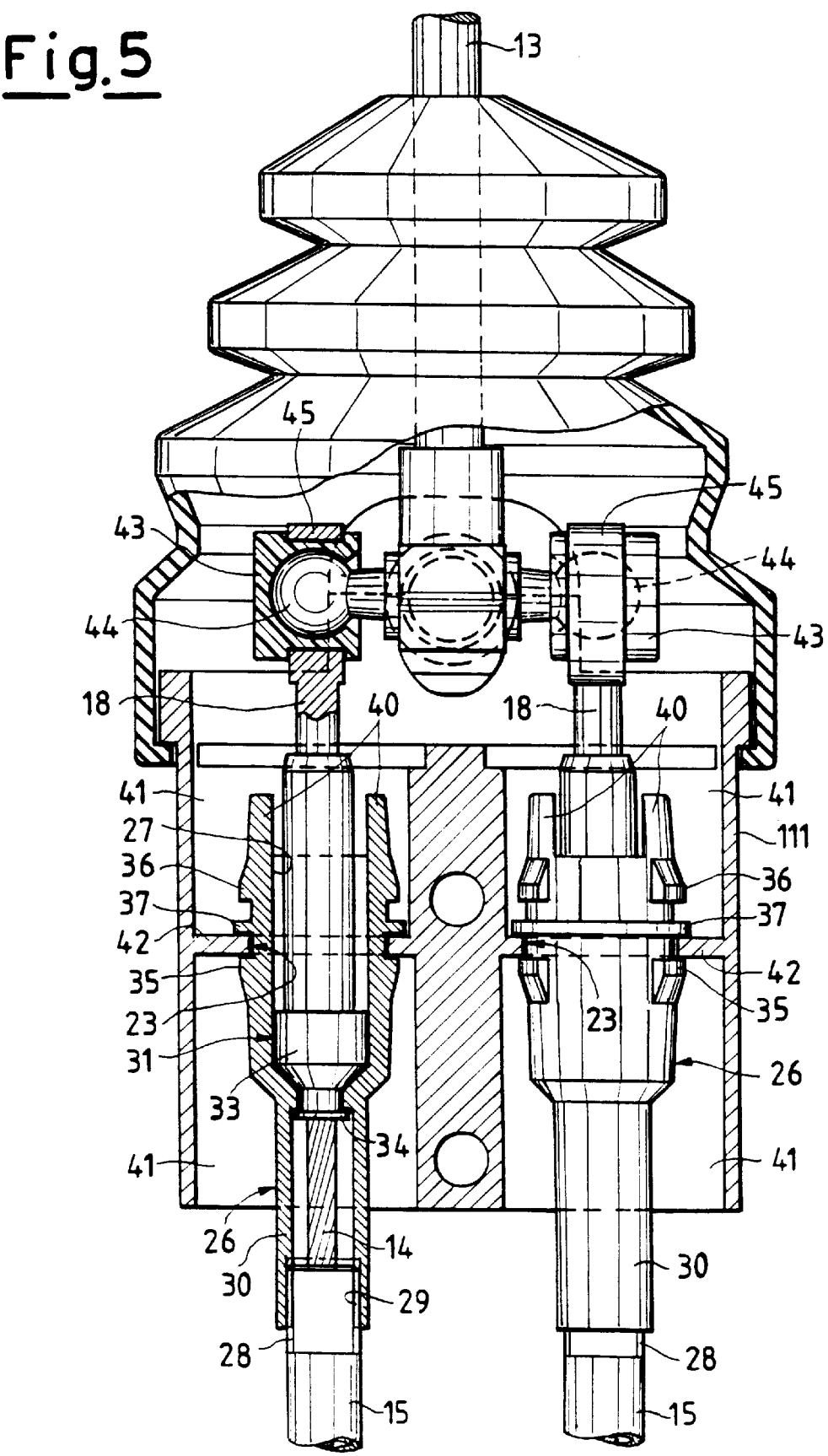
FIG. 5 shows a second embodiment of the arrangement for fast hooking in the case of remote-control through two flexible cables for a double-action group.

An additional peculiarity of the present application is shown in FIG. 5, in which the insertion is opposite to the one just described. Reasons of accessibility may, in fact, make it simpler or necessary to insert the cable directly from the top of the containment box, or similar component, which forms the base for the remote control device.

In view of the reasons set forth above, the presence of an additional pair of teeth 35 on the bush 26 has been described before. That is in fact the way in which a double-bayonet engagement has been achieved, and it can be realized either over or under the ring gear or support flange 37 so that the selected and/or needed assembly position has no influence at all.

FIG. 5, in which the same or similar elements are indicated by the same reference numbers, shows the final position for this second type of insertion. In this embodiment the box has been replaced with a box element 111 in which there are two cavities 41 divided into two portions by flanges 42 provided with openings 23 similar in all aspects to the openings previously described.

FIG. 5 shows an arrangement for fast hooking of a remote control by means of two flexible cables 14, constrained to the lever 13 by a ball coupling. This coupling includes a sleeve 43 capable of receiving a ball element 44 extending from the lever 13. The sleeve 43 is kept inside an eyelet 45 extending from the final portion 18 of the cable 14.

An additional characteristic of the present invention must be also pointed out.

It is possible to notice, in all the figures, that the extremity facing the inner part of the bush 26 is provided with a pair of appendices 40 placed at the opposite sides of the same generatrix of the two pair of teeth 35 and 36 and protruding outwards.

The presence of these two appendices 40 on the bush allows to control the transverse movements of the cable 14, thus limiting its movement and any clearance, but without stopping the longitudinal oscillation movement while the control lever 13 moves. In detail, the bush 26 object of the present invention, presents differences in terms of its internal and external shape. The internal seat or cavity 27 is rectangular in shape with rounded end portions so that the cable can move longitudinally along the longer side of the rectangle while the transverse movement along the shorter side of the rectangle is limited. The presence, on the already mentioned end portion of the bush 26, of the two expansions 40 with the internal surface flat and parallel to the longer side of the rectangle previously described helps limit said movement. These two expansions 40, which protrude outwards, limit also the transverse skid and contain the cable, in particular its hook-shaped curved end 18, into its working seat.

In this manner, the lid does not lock the bush inside the opening in the box and there is no need for a flat expansion on the closing lid of the box to keep the end of the cable fixed to the control lever in its position.

Therefore, the object of the present invention represents a solution to the problem of clutching the cable quickly into the control lever and facilitates its insertion into the seat in the box. Such insertion can be made either from outside or from inside the box. At the same time, the bush constrains transverse movement of the cable that could cause the disengagement of the cable from the seat in the control lever.

We claim:

1. Arrangement for remote-control fast hooking by flexible single or multiple cables, which comprises:

a lever receiving an end portion of at least one cable and which is oscillatable with respect to a base box element connectable to an external structure of an operating machine, said box element having at least one opening with holding elements for passage of a cable and positioning of a reaction sheath housed into a containment bush, wherein said containment bush is provided with bayonet elements which are insertable into said opening and are connectable with said holding elements and wherein said bush has an end portion insertable into said base box element, provided with a pair of appendices placed at opposite sides of the same generatrix of said elements for bayonet engagement and which protrude outwardly.

2. Arrangement as claimed in claim 1, wherein said bayonet elements include at least one tooth protruding from said bush and a flange separated from said at least one tooth by at least the thickness of the wall of said base box element, and wherein said engagement elements with/and holding elements in said opening include at least one widened part or expansion to receive said at least one tooth.

3. Arrangement as claimed in claim 1, wherein said elements for bayonet engagement include at least two teeth protruding from said bush, each of said teeth being located on opposite positions with respect to a flange separated from each tooth by at least the thickness of the wall of said base box element, and wherein said engagement elements with/and holding elements in said opening include at least one widened part or expansion to receive said at least one tooth.

4. Arrangement as claimed in claim 1, wherein said end portion of at least one cable comprises a hook-shaped end portion and is insertable into a hole in said lever.

5. Arrangement for remote-control fast hooking by flexible single or multiple cables, which comprises:

a lever receiving an end portion of at least one cable and which is oscillatable with respect to a base box element connectable to an external structure of an operating machine, said box element having at least one opening with holding elements for passage of a cable and positioning of a reaction sheath housed into a containment bush, wherein said containment bush is provided with bayonet elements which are insertable into said opening and are connectable with said holding elements, said end portion of at least one cable comprises a hook-shaped end portion and is insertable into a hole in said lever and wherein a driving element for said hook-shaped end portion is insertable into said hole in said lever.

6. Arrangement as claimed in claim 5, wherein said driving element includes a first cylindrical part provided with a notching which is positionable into said hole and a second part presenting a funnel-shaped configuration with a V-shaped expansion.

7. Arrangement as claimed in claim 6, wherein said second part is provided with two sides, the height of which contains the movement of said hook-shaped end portion of said cable.

8. Arrangement as claimed in claim 6, wherein said second part has an inclined plane, on which said hook-shaped curved end portion of said cable is slidable.

9. Arrangement as claimed in any of claims 5 to 8, wherein said driving element is made of plastic.

10. Arrangement as claimed in claim 5, where in said driving element is positionable in said hole.

11. Arrangement as claimed in claim 6, wherein said bayonet elements include at least one tooth protruding from said bush and a flange separated from said at least one tooth by at least the thickness of the wall of said base box element and wherein said engagement elements with/and holding elements in said opening include at least one widened part or expansion to receive said at least one tooth.

12. Arrangement as claimed in claim 5, wherein said elements for bayonet engagement include at least two teeth protruding from said bush, each of said teeth being located on opposite positions with respect to a flange separated from each tooth of said teeth by at least the thickness of the wall of said base box element and wherein said engagement elements with/and holding elements in said opening include at least one widened part or expansion to receive said at least one tooth.

13. Arrangement as claimed in claim 5, wherein said bush has an end portion insertable into said base box element provided with a pair of appendices placed at opposite sides of the same generatrix of said elements for bayonet engagement and protruding outwards.

* * * * *

UNITED STATES PATENT AND TRADEMARK OFFICE
CERTIFICATE OF CORRECTION

PATENT NO. : 6,024,509
DATED : February 15, 2000
INVENTOR(S) : Walter Barbieri et al.

It is certified that error appears in the above-identified patent and that said Letters Patent is hereby corrected as shown below:

<u>Title page,</u>
Item [75], the 1$^{st}$ and 3$^{rd}$ Inventor's names and residence are listed incorrectly. It should read as follows:
-- [75] Walter Barbieri, Trezzo S/Adda; Antonello Alicata, Dalmine; Giovanni Crespi, Trezzo S/Adda, all of Italy --

Signed and Sealed this

Eighteenth Day of June, 2002

*Attest:*

*Attesting Officer*

JAMES E. ROGAN
*Director of the United States Patent and Trademark Office*